United States Patent
Danielsson

[15] 3,678,775
[45] July 25, 1972

[54] APPARATUS FOR TRANSMITTING ROTATIONAL POWER TO A ROLL

[72] Inventor: Erik Danielsson, Karlstad, Sweden
[73] Assignee: Aktiebolaget Karlstad Mekaniska Werkstad, Karlstad, Sweden
[22] Filed: Oct. 20, 1970
[21] Appl. No.: 82,447

[30] Foreign Application Priority Data
    Oct. 21, 1969   Sweden..............................14406/69

[52] U.S. Cl.............................................................74/410
[51] Int. Cl.......................................................F16h 57/00
[58] Field of Search........................................74/410, 665 P

[56] References Cited
    UNITED STATES PATENTS
    2,936,655   5/1960   Peterson et al. .....................74/410 X
    3,451,290   6/1969   Wildhaber...........................74/410 X
    3,572,171   3/1971   Per-Erik Arne Larsson............74/410

Primary Examiner—Leonard H. Gerin
Attorney—Brumbaugh, Graves, Donohue & Raymond

[57] ABSTRACT

Rotational power is transmitted to a roll of the type having a cylindrical, hollow shell rotatably mounted on a stationary, central through-shaft by a gear system composed of an internally spur gear affixed to the shell, a pair of pinion gears mounted for rotation by self-aligning bearings carried on shafts affixed to the through-shaft of the roll and an external spur gear positioned within a cavity in the main shaft. The pinion gears partially project through openings formed in walls that define a cavity in the shaft, and the axis of each pinion gear shaft is oriented parallel to the shell of the roll in a plane that is perpendicular to the plane along which the shell and shaft will deflect when loaded. The external spur gear is connected to a drive shaft that is composed of two portions connected to each other by a universal coupling, the portion of the drive shaft carrying the external spur gear thus being mounted for articulation relative to the main power input shaft. The elements of the gear system are maintained in parallel relation to each other and in proper mesh, regardless of the extent of deflection of the shell and through-shaft of the roll under load.

3 Claims, 3 Drawing Figures

Patented July 25, 1972

INVENTOR.
ERIK DANIELSSON

BY his ATTORNEYS

INVENTOR.
ERIK DANIELSSON

BY
his ATTORNEYS

APPARATUS FOR TRANSMITTING ROTATIONAL POWER TO A ROLL

BACKGROUND OF THE INVENTION

This invention relates to rolls of the type comprising a hollow, cylindrical shell that is rotatably mounted on a stationary central through-shaft and, in particular, to apparatus for transmitting rotational power to the shell of the roll.

In a common form of the construction for rotatable rolls that are subjected to high loading and are required to present a true surface at a nip with another roll, such as calender rolls used for calendering paper and paperboard and other sheet-type products, a hollow, cylindrical shell is mounted for rotation about a fixed, central through-shaft that is suitably supported at each end, and in turn supports the shell by means of bearings adjacent the ends of the shell. Frequently, these rolls include mechanisms for compensating for the deflection and deformation of the shell and shaft under the dead load of the roll itself and the loads which are imposed upon it in operation. The deformation and deflection of the shell on the one hand and the shaft on the other hand almost always result in the shaft axis and roll axis being non-parallel over most of the length of the roll, and the lack of parallel relation of the axes makes it difficult to provide for the transmission of rotary power to the shell. Various types of rotary drives for these types of rolls have been proposed and used in the past.

For example, one type of drive is composed of either an internal or external gear ring affixed to one end of the tubular shell of the roll and driven by a gear carried on a drive shaft that is positioned parallel to the shell and adjacent the through-shaft of the roll. A significant disadvantage of this arrangement is that it requires a considerable amount of space in the region adjacent the roll ends and the roll supports, such space often being required for other equipment associated with the roll.

Another type of drive employs a three-ring bearing for mounting the shell. The inner ring of the bearing is mounted on the end of the shaft of the roll, the outer ring is mounted in a bearing support that is part of the support for the main shaft of the roll, and the center ring of the three is attached on one side to the shell and on the other side to a rotatable drive shaft that is coaxial with the shell and extends to the outside of the support for the roll. With such an arrangement, half of the total of the dead load and the operating load are transmitted to one of the supports of the roll through the three-ring bearing. If the bearing is to have a reasonable service life, it must have a relatively large outside diameter which, in most cases, will be impracticably large, relative to the diameter of the roll. Accordingly, the only practical solution is to sacrifice service life in order that the bearing may be of a practical size.

SUMMARY OF THE INVENTION

There is provided, in accordance with the present invention, a novel and an improved apparatus for transmitting rotational power to a roll of the type composed of a shell rotatably mounted on a fixed through-shaft. The apparatus comprises a gear system for transmitting driving force to the shell by way of a drive shaft that is generally coaxial with the through-shaft of the roll. The components of the gear system are, according to the invention, mounted in such a way as to remain in proper mesh and in proper alignment and, therefore, are not subject to extraordinary wear due to improper mesh.

More particularly, an internal spur gear of the gear system is affixed to the shell adjacent one end of the roll and in coaxial relation to the shell. A pair of pinion gears are mounted in positions opposite each other for rotation by means of self-aligning bearings carried on shafts that are affixed to the through-shaft of the roll. The pinion gears are, of course, positioned to mesh with the internal spur gear, and the axis of each pinion gear shaft is oriented parallel to the shell in a plane that is perpendicular to the plane along which the shell and shaft wall deflect and deform when loaded in normal operation of the roll. An external spur gear in the gear system is positioned within a cavity formed in the end of the shaft and having openings through which the pinion gears partially project in order to mesh with the external spur gear.

In the usual form of construction embodied in rolls of the type with which the invention is concerned, the shell is mounted on the through-shaft by means of self-aligning bearings of the type having a spherical outer race that allows the bearing balls or rolls to run true, even though the axis of the shell may not be aligned with the axis of the roll under the loaded condition. When the shell is loaded in operation, the load is transmitted from the shell to the shaft and causes the shaft to bow. Various known mechanisms are frequently employed to keep the shell surface straight or true or even to cause it to bend in a direction opposite to that of the shaft. With such mechanisms, the axes of the shell and the shaft will be non-parallel to each other along almost the entire length of the roll. Preferably, a drive arrangement, according to the invention, embodies, as a further feature to compensate for the lack of alignment between the shell and shaft axes, the use of a universal coupling in the shaft on which the external spur gear of the gear system is mounted and by which the shell is driven. More particularly, the drive shaft includes two portions, the outermost portion of which, relative to the longitudinal center of the roll, is mounted for rotation on an axis that is coaxial with the end of the through-shaft of the roll. The second portion is connected to the first by a suitable universal coupling at one end and carries the external spur gear at the other end. Consequently, the external spur gear can shift position, relative to the pinion gears, so as to afford a proper mesh with the external spur gears.

Among the advantages of the drive arrangement, according to the invention, is the fact that it occupies a minimum of space and, in particular, is based on components that are mounted substantially entirely within the elements of the roll shell and the through-shaft rather than outside of the shaft, as in the form of drives employed heretofore. The drive arrangement does not require providing relatively complicated support arrangements for the through-shaft and for the bearings of the shell, nor does it require designing and dimensioning the supports, shaft and bearings so that they are adapted to perform functions other than their primary purposes. Further, none of the components of the gear system are employed to support any components of the roll, as is the case with some types of drive. If a drive arrangement, according to the invention, embodies the preferred feature of mounting the external spur gear on a shaft portion that can articulate relative to the main drive shaft, the further advantage of the maintenance of a proper mesh between the external spur gear, the pinion gears and the internal spur gear, due to the self-aligning tendency of the gears, contributes significantly to the useful life of the drive arrangement.

DESCRIPTION OF THE DRAWINGS

For better understanding of the invention and the advantages it provides, reference may be made to the following description of an exemplary embodiment, taken in conjunction with the figures of the accompanying drawings, in which.

DESCRIPTION OF EXEMPLARY EMBODIMENT

Figure 1:
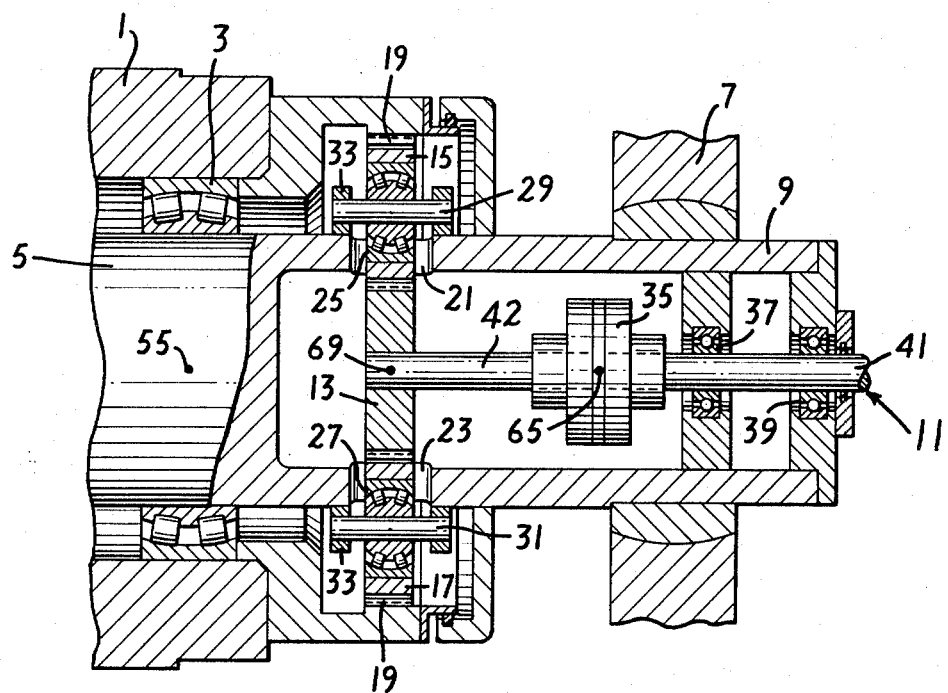
FIG. 1 is a cross-sectional view taken generally along the axis of the roll and along a plane that is substantially perpendicular to the plane along which the roll will deform and deflect upon loading, the view illustrating only the end portion of the roll and the components of the drive arrangement.

In the drawing, the reference numeral 1 designates generally the shell of the roll, the shell 1 being rotatably journaled by means of self-aligning bearings 3 on a stationary central through-shaft 5. The shaft 5 is supported at each end by a swivel mounting 7, only one of which is illustrated in the drawing. The end of the shaft which is to incorporate the drive that rotates the shell on the shaft, i.e., the end of the roll that is illustrated in the drawing, is formed with a hollow cavity 9, and a drive shaft, which is designated generally by reference numeral 11, extends longitudinally into the cavity 9. The shaft carries an external spur gear 13 which is affixed to the shaft and forms a part of a gear system that is employed to drive the shell 1. The external spur gear meshes with a pair of pinion gears 15 and 17 which, in turn, mesh with an internal spur gear 19 that is affixed to the shell 1. The pinion gears 15 and 17 extend partway into the cavity through slots 21 and 23 (see FIG. 3) formed in the wall that defines the cavity 9. The pinion gears 15 and 17 are mounted for rotation by means of self-aligning bearings 25 and 27 on shafts 29 and 31 that are affixed to a pinion gear carrier in the form of a ring 33 that is affixed to the through-shaft 5. The drive shaft 11 is composed of a portion 41 that is supported on an axis that is coaxial with the shaft 5 by a pair of spaced-apart bearings 37 and 39 appropriately mounted within the cavity, and a portion 42 that is connected to the portion 41 by a universal coupling 35. The main portion 41 of the drive shaft 11 is connected to a source of power (not shown).

The manner by which the gear system maintains itself in proper mesh is described below, and reference should be made to FIGS. 2 and 3 in conjunction with the description.

When the roll is subjected to a load, the load is transmitted through the self-aligning bearing 3 to the through-shaft 5, which in turn transmits the load into the swivel mounting 7. Because of the transmission of the load from the shell to the shaft through bearings that are located in spaced relation to the mounting 7 for the shaft, the shaft will be deformed or bowed by the loading. If the roll is a type that is provided with devices between the shell 1 and the shaft 5 for counteracting the bending, for example, devices which provide hydraulic pressure on the inner side of the shell in a direction against the load, a portion of the load will be transmitted through these devices to the central shaft. By means of such devices, the shell may be maintained straight or even be caused to bend in a direction opposite to that of the shaft.

Figure 2:
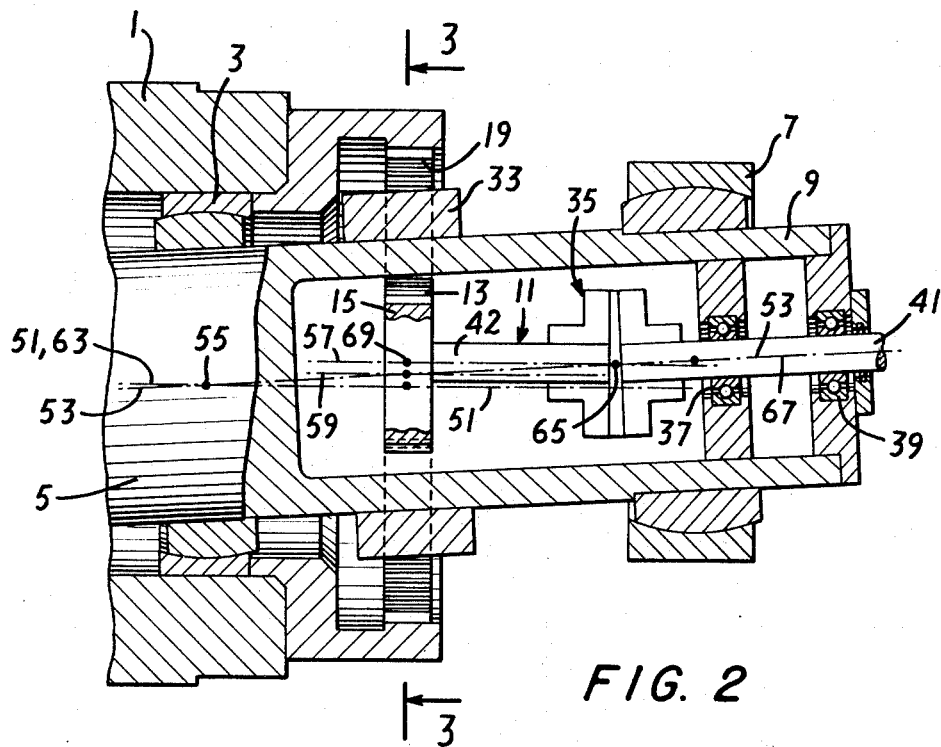
FIG. 2 is a cross-sectional view taken generally along the axis of the roll and in a plane perpendicular to the plane of the section of FIG. 1, the view further illustrating the components in positions into which they shift upon loading of the roll, but to a greatly exaggerated extent.
Figure 3:
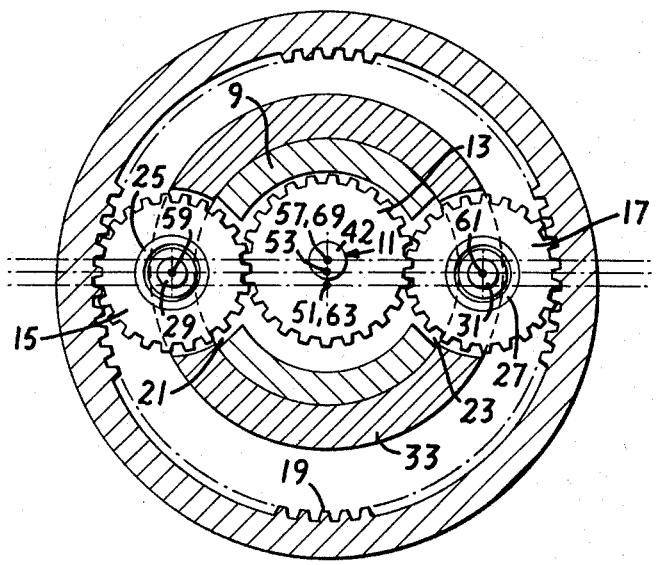
FIG. 3 is a cross-sectional view taken along a plane substantially perpendicular to the axis of the roll at the location of the gear system, as represented generally by the lines 3—3 in FIG. 2, and also showing the components in shifted positions under loading.

FIGS. 2 and 3 of the drawings illustrate the locations and directions of the axes of various elements of the roll and drive when they are deflected under load, the degree of deflection being exaggerated for greater clarity of illustration. In FIG. 2, the reference number 51 designates the axis of the through-shaft 5, 57 designates the axis of the external spur gear 15, 59 and 61 designate the axes of the two pinion gears 15 and 17, 63 designates the axis of the internal spur gear 19 and 67 designates the axis of the main portion 41 of the drive shaft 11.

When the roll is not subjected to any load, the axes 51 and 63 of the shell 1 and the through-shaft 5 of the roll, the axis of rotation 57 of the external spur gear 13, the axes of rotation 59 and 61 of the pinion gears 15 and 17, the axes of rotation 63 of the internal spur gear 19, the axis of rotation 67 of the shaft portion 41, the fulcrum of 65 of the universal coupling 35 and center of rotation 55 of the bearing 3 by which the shell 1 is mounted on the through-shaft 5 are all located in a common plane which is perpendicular to the direction of the load to which roll will be subjected.

Because of the bowing of the through-shaft 5 under the load transmitted to it from the shell 1, its axis 53, at the longitudinal central plane of the bearing 3, is at an angle to the axis 51 of the shell 1 at the same plane. Moreover, the axes 51 and 53 coincide only at a point 55 which constitutes the center of the spherical surface of the self-aligning bearing 3. Outside the self-aligning bearing 3, that is, to the right on FIG. 2, the axis 51 of the shell and the axis 63 of the internal spur gear 19 are below the axis of that part of the shaft 5 that is to the right of the bearing 3, such part also being the part of the shaft on which the pinion gear carrier 33 is mounted. Accordingly, the axes 59 and 61 of the pinion gears 19 are located above the axis 51 of the shell 1 and the axis 63 of the internal spur gear 19 (see FIG. 3).

In order for the gear system to function properly without undue strain and possible failure and under conditions that limit wear of the gear as much as possible, it is necessary that the axes of rotation 59 and 61 of the pinion gears 15 and 17, the axis of rotation 57 of the external spur gear 13 and the axis of the rotation 63 of the internal spur gear 19 remain parallel at all times. The drive arrangement, according to the invention, meets that requirement in the following manner.

To begin with, the axis of rotation 63 of the internal spur gear 19 coincides with the axis 51 of the shell 1 of the roll, since the internal spur gear 19 is mounted on the shell. Inasmuch as the pinion gears 15 and 17 are, as mentioned above, journaled on self-aligning bearings 25 and 27, they are able to pivot so that their axes of rotation will remain parallel to the axis of rotation of the internal spur gear 19, such pivoting of the pinion gears resulting from the tendency for the pinion gears to want to track properly on the internal spur gear. Inasmuch as the external spur gear 13 is mounted on a shaft portion 42 that is articulated on a fulcrum, which is designated by the numeral 65 in FIG. 2, constituted by the center of the universal coupling 35, it can shift in response to adjustment of the position of the pinion gears so that its axis of rotation 57 will be parallel to the axis of rotation 63 of the internal spur gear 19.

As described above, when the shell 1 is subjected to a load in operation and, therefore, is displaced downwardly upon bending of the through-shaft 5, the internal spur gear 19 is likewise displaced downwardly relative to the pinion gears 15 and 17. Such displacement causes the pinion gears 15 and 17 to rotate slightly on their bearings, the pinion gear 15 rotating counterclockwise and the pinion gear 17 rotating clockwise. It is these rotations of the pinion gears that cause the external spur gear 13 to be displaced upwardly, the amount of upward displacement of the external spur gear 13 relative to the planet gears 15 and 17 being equal to the amount of displacement downwardly of the internal spur gear 19 relative to the pinion gears. As mentioned previously, the pinion gears are free to shift so that their axes remain parallel to the axis of the internal spur gear 19, and they will all do so in order to track properly on the internal spur gear.

Preferably, the universal coupling 35 in the shaft 11 is located, longitudinally of the roll, so that it is equidistant from the longitudinal center 69 of the external spur gear 13 and the longitudinal center of the bearing 3. With this relationship, which creates substantially equilateral triangles between portions of the axes internecting at the points 55 and 65, the axis of rotation 57 of the external spur gear 13 will always remain substantially parallel to the axis of rotation of the internal spur gear, regardless of the extent of relative displacement of the axis of the internal spur gear relative to the axis of the through-shaft.

Thus there is provided, in accordance with the invention, a drive arrangement in which all of the gears of the gear system remain parallel under various conditions of operation. Although the manner in which the gear system achieves parallel relation between the axes of the components also results in slight relative displacements of the axes of the components in transverse planes of the roll, such relative displacements are of insignificant magnitude. The slight relative displacements of the gears in the axial direction of the roll are also insignificant and do not affect the operation of the gear train, particularly if the teeth of the gears are straight.

I claim:

1. Apparatus for transmitting rotational power to a roll of the type having a cylindrical shell rotatably mounted by self-aligning bearings on a stationary central shaft that is supported at each end comprising an internal spur gear affixed to the shell and coaxial therewith, a pair of pinion gears mounted for rotation by self-aligning bearings carried on shafts affixed to the central shaft of the roll, the pinion gears being positioned to mesh with the internal spur gear and the axis of each pinion gear shaft being oriented parallel to the shell in a plane that is perpendicular to the plane along which the shell and shaft will deflect when loaded, and a driven external spur gear positioned within a cavity in the shaft and meshing with the pinion gears, the pinion gears partially projecting through openings in the walls of the central shaft that define the cavity, and the external spur gear, pinion gears and internal spur gear constituting a gear system for transmission of driving power to the shell to rotate it about the central shaft.

2. Apparatus according to claim 1 and further comprising a first drive shaft component carrying the external spur gear, a second drive shaft component mounted for rotation about an axis substantially coincident with the axis of the central shaft of the roll, and a universal coupling between the drive shaft components to afford articulation between the drive shaft components while transmitting rotation between them.

3. Apparatus according to claim 2 wherein the distances, measured axially of the roll, (1) from the axial center of the bearings by which the shell is mounted on the shaft to the axial center of the external spur gear and (2) from the axial center of the external spur gear to the fulcrum of the universal coupling are substantially equal.

* * * * *